(12) United States Patent
Gunness (10) Patent No.: US 10,214,907 B1
(45) Date of Patent: Feb. 26, 2019

(54) LEAK DETECTION AND LOCATION SYSTEM

(71) Applicant: Clark Robert Gunness, Nashville, TN (US)

(72) Inventor: Clark Robert Gunness, Nashville, TN (US)

( * ) Notice: Subject to any disclaimer, the term of this patent is extended or adjusted under 35 U.S.C. 154(b) by 115 days.

(21) Appl. No.: 15/846,637

(22) Filed: Dec. 19, 2017

(51) Int. Cl.
| | | |
|---|---|---|
| *G01R 31/00* | (2006.01) | |
| *E04D 13/00* | (2006.01) | |
| *E04D 12/00* | (2006.01) | |
| *E04G 23/02* | (2006.01) | |
| *G01M 3/16* | (2006.01) | |

(52) U.S. Cl.
CPC ......... *E04D 13/006* (2013.01); *E04D 12/002* (2013.01); *E04G 23/0281* (2013.01); *G01M 3/16* (2013.01)

(58) Field of Classification Search
CPC ..... E04D 13/006; E04D 12/002; E04D 13/00; G01M 3/40; G01M 3/16; G01M 3/165; G01M 3/18; G01M 13/021; G01M 3/02; G01M 3/045; G01M 3/223; G01M 3/24; G01M 5/0025; G01M 5/0083; G01N 21/05; G01N 11/00; G01N 11/08; G01N 21/3554; G01N 21/3563; G01N 27/00; G01N 27/205; G01N 29/036; G01R 19/00; G01R 19/0084; G01R 19/0092; G01R 19/155; G01R 19/10; G01R 19/145; G01R 19/165; G01R 19/1659; G01R 27/08; G01R 27/14; G01R 19/28; G01R 1/06; G01R 1/073; G01R 29/12; G01R 33/50
USPC ..................................................... 324/755.09
See application file for complete search history.

(56) References Cited

U.S. PATENT DOCUMENTS

| | | | | |
|---|---|---|---|---|
| 7,872,479 | B2* | 1/2011 | Lorenz ..................... | G01M 3/16 324/525 |
| 8,566,051 | B2* | 10/2013 | Gunness ............... | E04D 13/006 324/444 |
| 9,157,828 | B2* | 10/2015 | Jaman .................. | G01N 27/048 |

\* cited by examiner

*Primary Examiner* — Vinh P Nguyen
(74) *Attorney, Agent, or Firm* — Catherine Napjus; Michael Persson; Lawson Persson & Chisholm, P.C.

(57) ABSTRACT

The present invention is a leak detection and location system that includes a waterproofing membrane; an underlayment disposed directly below the waterproofing membrane, wherein the underlayment is non-conductive and will become conductive only when saturated; a conductive layer disposed below the underlayment; a voltage source attached to the upper side of the waterproofing membrane and the lower side of the underlayment; a test set with two handheld poles and an indicator that indicates a difference between voltages detected by the handheld poles; and a device that creates an electrical field across the waterproofing membrane.

20 Claims, 11 Drawing Sheets fig. 1 Prior Art fig. 2a Prior Art fig. 2b Prior Art fig. 3a Prior Art fig. 3b Prior Art fig. 4a fig. 4b fig. 5a fig. 5b fig. 6a fig. 6b fig. 7a fig. 7b

Fig. 7C fig. 8a fig. 8b fig. 9a fig. 9b fig. 10a fig. 10b

LEAK DETECTION AND LOCATION SYSTEM

FIELD OF THE INVENTION

The present invention relates to the detection and location of water leakage in structures.

BACKGROUND

Roof and waterproofing membranes and linings have long been used to protect buildings, to contain water in ponds and decorative water features, to prevent leaching of contaminants from landfills, and for other purposes. While these membranes have utility, leakage through the membranes is an ongoing problem. The efforts to contain and locate leakage have resulted in the rise of specialized consultants, air and vacuum testable membranes, and electrical testing methods that not only determine if a leak is present in a membrane system, but where the leak is located.

Detecting water leaks in electrically non-conductive roofing and waterproofing membranes using electronic means has been used for decades. Methods such as those described by U.S. Pat. No. 4,565,965 (hereinafter "Geesen") and U.S. Pat. No. 7,872,479 (hereinafter "Lorenz") use a similar method first described by Geesen. The basis of detection in these inventions is that leak location requires a manually held and operated two-pole arrangement to indicate the location of a leak. In the method shown by Lorenz, and referring to prior art FIG. 1, each pole 70 being held at arm's length apart from the other pole 71, measures the electrical field 85 on the surface of the roofing or waterproofing membrane 66 at the point at which the pole touches the membrane or the overburden surface above the membrane if the membrane is under soil, pavers or the like. A measuring unit 69 through which the two poles 70, 71 are connected compares the input of each pole and, via the small amount of current flow from the pole receiving a higher voltage to the pole receiving the lower voltage, indicates which pole has the lower voltage (or the higher voltage, depending on how the mechanism is adjusted) compared to the other pole. This creates an electrical slope 81, 82, 83, 84 that can be detected by the aforementioned procedure. It is water from leakage that contacts the supporting structure of the building or other construction entity 61, located on the underside (below) the membrane that allows these electrical slopes 81-84 to develop as the power source 72 references the structure on one of its terminals. This allows the user of the two-pole method to make judgements as to which direction the electrical field 85 slopes by following the direction of a needle or vector 86 on the measuring unit 69 and to follow that indicated electrical slope to the supposed point of leakage.

Figure 1:
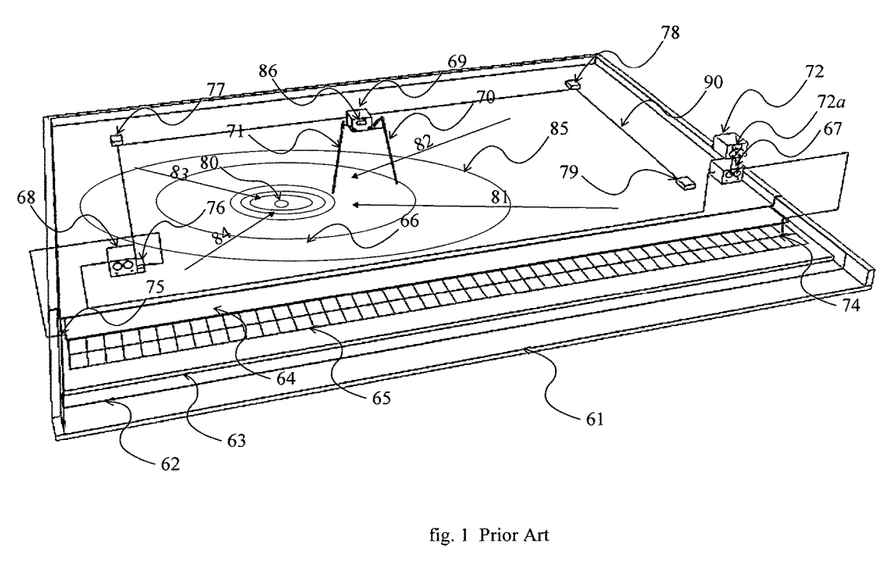
FIG. 1 is a diagram of a prior art system according to Lorenz.

While Geesen taught that the structure of the building must be conductive and referenced by one side of the power source for the method to work, Lorenz et. al. in their embodiment, added the provision of an additional layer of conductive material 65 directly under the membrane 66 to which one terminal of the power source 72 is connected as a reference, thus bypassing the conductive structure of the building 61, but achieving the same result of leak location. In this second embodiment, it is claimed that the conductive material 65 positioned directly under the membrane provides a more reliable connection to the power source 72 and thus provides a more reliable test when searching for a leak. FIG. 1 also shows a felt separating layer 64 that is used only to protect the membrane 66 from mechanical damage from the conductive material 65, which may be metal grating.

While Lorenz can be an effective method of leak location, both Lorenz and Geesen have an unaddressed problem that is the basis for this application: the membrane 66 must be non-conductive and remain non-conductive for this method to work effectively. If the conductive properties of the membrane allow more current to pass through it over time when the membrane is exposed to constant moisture or cycles of moisture, the electrical field 85 measured by the two poles 70, 71 can become nearly identical, as the entire surface of the membrane is allowing current to pass through it to the mesh, creating no reliable readings to indicate leakage or false positives.

This electrically permeable membrane can and does occur when the membrane has been exposed to moisture for a period of time, especially when the membrane is buried under green roofing or covered by gravel or pavers. The inventor's experience and subsequent tests with membranes exposed to moisture range from slight degradation of the dielectric properties of the membrane to a membrane that is almost transparent to electrical current for the purposes of scanning the membrane and locating leaks using the above-described electrical method. The materials from which the membranes are manufactured vary in their response to moisture: some membranes, such as thermoplastic olefins (TPO), can hold up fairly well exposed to moisture over time, but membranes such as PVC and Modified PVC membranes (KEE) and several Modified Bitumen membranes lose some of their electrical resistance properties over a similar period of time. Also, the addition of reinforcing in a membrane can also determine some of its electrical resistance characteristics.

To summarize, the system disclosed in Lorenz, which is hereby incorporated by reference, includes at least one conductive metal grating web beneath at least one insulating sealing web with an upper and lower face; at least one voltage source applied between the upper and lower faces of the sealing web and where the metal grating web is connected to a pole of the voltage source; and a test set with two measurement sensors that scans the upper face of the sealing web. Although this system may function as intended in ideal conditions, it has several drawbacks. Most significantly, even insulating membranes, like Lorenz's insulating membrane may be come conductive over time due to moisture vapor transmission. As water gradually permeates the insulating membrane, the conductive web beneath the insulating membrane becomes electrically transparent to any sensing from above and the electrical current can move through the insulating membrane itself.

This phenomena of increased conductivity of insulating membranes has been documented for decades. In the 1950's, for example, Bell Labs noted that high tension wires started arcing after a few years in service. A study was commissioned to find the mechanism that caused this degradation in insulating ability. Ultimately, the study indicated increased conductivity of cable-grade polyethylene exposed to weather over time. Anecdotally, the present inventor performed an informal study whereby he immersed ostensibly insulating membranes in water and then let them dry. A few days later, he tested the membranes and all had become more conductive. If the insulating membranes in systems such as Lorenz become conductive, the voltage detection mechanisms will no longer be able to discern a leaking membrane from a sound membrane.

Therefore there is a need for an improved leak detection and location system that addresses the issue of insulating membranes becoming conductive through exposure.

SUMMARY OF THE INVENTION

The present invention is a leak detection and location system.

In its most basic form, the leak detection and location system of the present invention includes at least one waterproofing membrane with an upper side and a lower side; at least one underlayment with an upper side and a lower side disposed directly below the waterproofing membranes, wherein said at least one underlayment is non-conductive and will become conductive only when saturated with water; at least one conductive layer disposed below the underlayment; a voltage source with first and second poles, wherein the first pole of the voltage source is attached to the upper side of the waterproofing membrane and the second pole is attached to the conductive layer; a test set comprising two handheld poles, each of which detect a voltage at a location where the pole is located; and an indicator that indicates a difference between the voltages detected by each of the handheld poles; and a device for creating an electrical field across the waterproofing membrane.

The inventor's U.S. Pat. Nos. 8,566,051; 9,341,540; 9,500,555; 9,624,671; 9,624,672; 9,632,033; and 9,823,161, which disclose related subject matter are hereby incorporated by reference.

The system of the present invention includes a waterproofing membrane over a conductive layer. It is required that the waterproofing membrane be waterproof, but otherwise may be any type of membrane commonly used in the art, and as disclosed in the inventor's issued patents. There may be more than one layer of waterproofing membrane, so that the top layer is the uppermost layer and the bottom layer is the lowermost layer. In addition, each waterproofing membrane has an upper side and a lower side.

The key inventive inclusion of the present invention is the underlayment between the waterproofing membrane and the conductive layer. The drawbacks of Lorenz and similar systems, described above, can be completely circumvented during the construction of the membrane envelope, which is by the inclusion of the underlayment. Like the waterproofing membrane, there may be more than one layer of underlayment and each layer of underlayment includes an upper and lower side. The upper side of the uppermost underlayment is always directly beneath the lower side of the lowermost waterproofing membrane. That is to say, when the system includes only one waterproofing membrane and only one underlayment, the underlayment is directly beneath the waterproofing membrane. The underlayment is not electrically conductive at all when dry, and does not conduct electricity well even when partially wetted. Preferred embodiments of underlayments therefore may include those made of polyisocyanurate, wood, gypsum, fiberglass, certain types of felts or bitumen. As used herein, in this context, when it is said that the underlayment is "made" of these various materials, it is understood that the underlayment may be made entirely or partially of that material. The requirement is that the underlayment is non-conductive when dry, so the underlayment may be made of whatever percentage of the materials listed above that will allow the underlayment to meet that requirement. The fiberglass and gypsum embodiments of the underlayment may, for example, be those of the type sold under the trademark DENSDECK. The underlayment may also be made of drywall or other rigid board that is non-conductive when dry.

In a preferred embodiment, the upper side of the underlayment is adhered to the lower side of the waterproofing membrane or the lower side of the separation layer if a separation layer is included. Because these underlayments can be ordered in different thicknesses and can be covered in different "skins", the underlayments can provide a better, stronger adhesion surface than that created by adhering the waterproofing membrane surface directly to the insulation layer. There are also roofs that are directly adhered to the structure of the building. Some ballasted roofs are not adhered at all, but are loose laid over the insulation layer like a tarp.

If the conductive layer is placed below the underlayment, it is completely removed from contact with the waterproofing membrane. What this means in terms of function is that the waterproofing membrane can become conductive when wetted over time, but if the waterproofing membrane is watertight, then no water reaches the conductive layer below the underlayment and no false positives or loss of resolution are generated during testing. It is only when water actually makes it around the edges of the underlayment and reaches the conductive layer that the reference circuit is closed and the leak can be detected and discovered.

The conductive layer may be any of those commonly used in the art and disclosed in the inventor's issued patents and related art, such as Lorenz and Geesen. In preferred embodiments, the conductive medium may be a metal mesh, such as a matrix of welded wire or a multi-axial expansion-constrained conductive medium. The matrix of welded wire may be a 2"×2" or other dimension of crisscrossing of metal wires. The multi-axial expansion-constrained conductive medium is made of specially annealed stainless steel, preferably annealed 304 stainless steel. The annealing is necessary to process the medium into a preferred hexagonal patterned netting, in a similar orientation to chicken wire. It is understood that other matrix patterns other than hexagonal are also included. The specially annealed stainless steel has a higher toughness (i.e. ability to absorb energy and deform without fracturing) than normal steel used in regular chicken wire, however. The hexagonal pattern of the wires may have approximately ¾" spaces between metal strands, but this is merely a preferred dimension and may be greater or less than ¾". As used herein "multi-axial expansion-constrained conductive medium" will refer to a matrix of annealed stainless steel with a toughness greater than regular steel strands used in standard chicken wire. The conductive layer may also be a conductive polymer such as coated PVC, a conductive filament such as polyester or polypropylene, or a conductive coating, such as the epoxy coating, such as that sold under the trademark DETEC. There may be more than one layer of conductive layer, so that the top layer is the uppermost layer and the bottom layer is the lowermost layer. In addition, each conductive layer has an upper side and a lower side.

The system of the present invention also includes a voltage source. One pole of the voltage source is attached to the upper side of the waterproofing membrane and the second pole is attached to the conductive layer. The system also includes a test set. The test set includes two handheld poles, each of which detects a voltage at a location where the pole is located. An indicator on the test set indicates a difference between the voltages detected by each of the handheld poles. As used herein, the "difference" between the voltages may be indicated by an actual value that is the difference between the measured voltages; the actual values of the measured voltages; a needle that swings toward a higher or lower voltage detected; an indication of slope of the voltage; or any other indication of a difference in voltage that is commonly used in the art. Although the test set with two poles is preferred, one of at least ordinary skill in the art will recognize that different methods of detecting voltage across the waterproofing membrane, such as various methods disclosed in the inventor's issued patents may also be successfully used with a similar system. For example, a voltmeter may replace the two handheld poles for measure the change in the slope of the electrical field. In one version with a voltmeter, a roller connected to a voltmeter may be rolled across the waterproofing membrane and an alert could sound when voltage dips at a certain location. The test set may also include an ammeter.

The system also includes a device for creating an electrical field across the waterproofing membrane. This device is preferably either a boundary wire loop or one or more attractor cables, each of which are disclosed in the inventor's issued patents.

It is preferred that the waterproofing membrane, underlayment, and/or conductive layer be adhered together. The lower side of the lowermost waterproofing membrane may be adhered to the upper side of the uppermost underlayment. The lower side of the lowermost underlayment may be adhered to the upper side of the uppermost conductive layer. The waterproofing membrane, the underlayment, and the conductive layer may all be adhered together. This adhesion may be accomplished with hot or cold bitumen; almost any industrial glue, whether thin-, medium-, or thick-bodied; or low-rise foam, which is the normal adhesive used in these applications. Low-rise foam works particularly well between the underlayment and the conductive layer when the conductive layer is a matrix of welded wire. The adhesion may be with foam, similar to the insulating foam sealant sold under the trademark GREAT STUFF. In some embodiments where foam is used as the adhesive, the foam does not cover the entire surface between the layers being adhered. Instead, the foam may be laid in strips or in curves, such as in an S-shaped pattern. Thus, there is a good portion of the area under the underlayment (and preferably between underlayments if there is more than one underlayment) that is free from foam. Little foam is required to adhere the layers together. Usually a 1" wide bead of foam is used and sufficient, as is well known in the construction and building engineering industries. Using foam as the adhesive allows the conductive layer, preferably the metal mesh, to have the potential to be exposed to water that penetrates to the lower face of the underlayment, as it will flow in the gap created by the foam and contact the mesh. Using the preferred fine ¾" multi-axial expansion-constrained conductive medium ensures that no water than comes through the underlayment will miss the conductive medium and not show as a leak in the system.

A preferred embodiment of the present invention also includes one or more layers of insulation or non-conductive vapor barrier disposed under the conductive layer.

These aspects of the present invention are not meant to be exclusive and other features, aspects, and advantages of the present invention will be readily apparent to those of ordinary skill in the art when read in conjunction with the following description and accompanying drawings.

DETAILED DESCRIPTION

Referring first to FIG. 1, a prior art testing setup according to Lorenz is provided. The roofing envelope construction is typical of insulated roofing construction with a structural deck 61, a possible vapor barrier 62, layers of insulation 63, and a roofing or waterproofing membrane 66. In Lorenz, there is a layer of conductive metal grating 65 that is placed directly under the membrane 66. Also indicated is a felt separating layer 64 that is used only to protect the membrane from mechanical damage from the metal grating. An electrical field on the surface of the membrane is created by the contact plates 76, 77, 78, 79 holding down the conductive wire loop 90 that forms a ring or loop interior of which creates an electrical field on the surface of the wetted membraneC. 66. Through connecting box 67, one pole of the power source 72 is connected to the metal grating 65. Through connecting box 68, the other pole of the power source 72 is connected to the conductive wire loop 90. If the membrane 66 has a breach 80 through which water can flow, then the two poles of the power source 72 can be referenced to one another through the conductivity of the water. This creates an electrical field 85, indicated by ellipses, in which the voltage from the conductive wire loop 90 reads higher as the measurement of that voltage is removed further from the reference contact or leak 80. This allows the test set or measuring device 69 to read the minute voltage differences by comparing one location on the membrane 66 to another location by using the two poles 70, 71. The needle or digital indicator on the measurement device 69 registers the voltage difference between the two poles by indicating the direction of the higher or lower voltage, depending on how the measurement device 69 is set up by the technician.

Figure 2A:
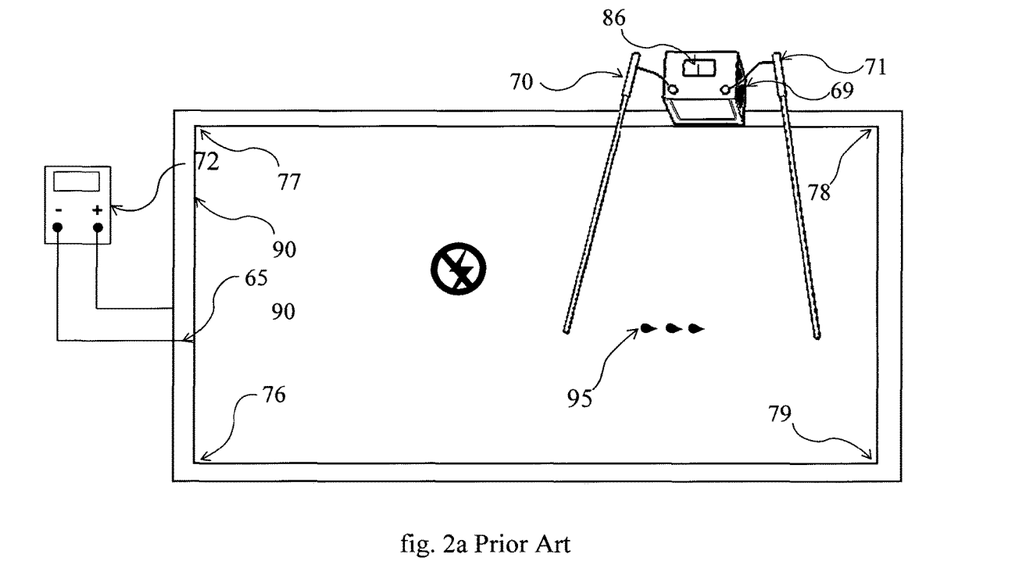
FIGS. 2a and 2b are top down and side cutaway views, respectively, of a system according to Lorenz where there is no breach in the membrane.
Figure 2B:
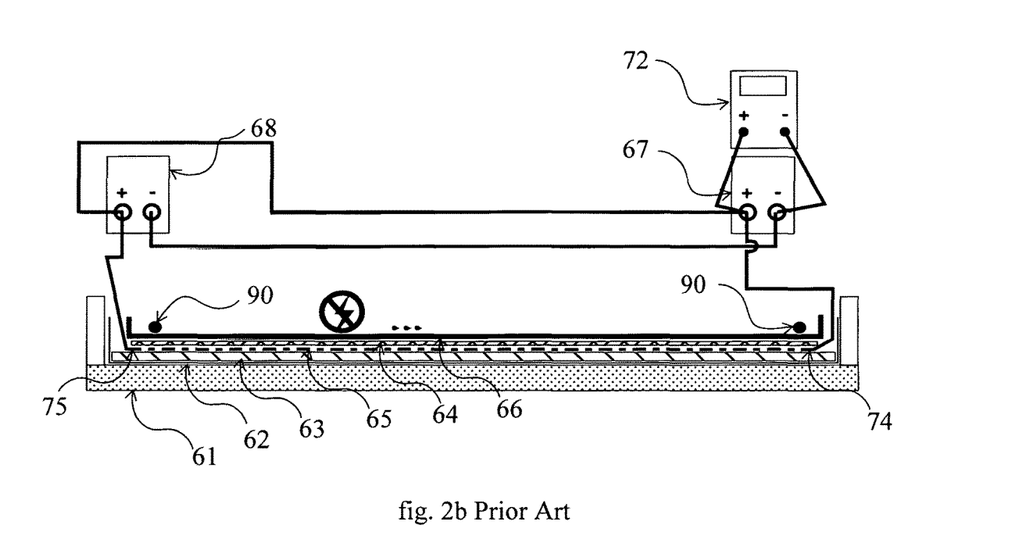

Now referring to FIGS. 2a and 2b, and still exemplifying Lorenz, a scenario with no leakage is provided. The membrane must be wet 95 for the system to work. Because there is no leakage, the power source 72 does not refer the conductive wire loop 90 on top of the membrane to the metal grating 65 under the membrane, so the indicator 86 on the measurement device 69 shows no difference in voltage from the right pole 70 to the left pole 71.

Figure 3A:
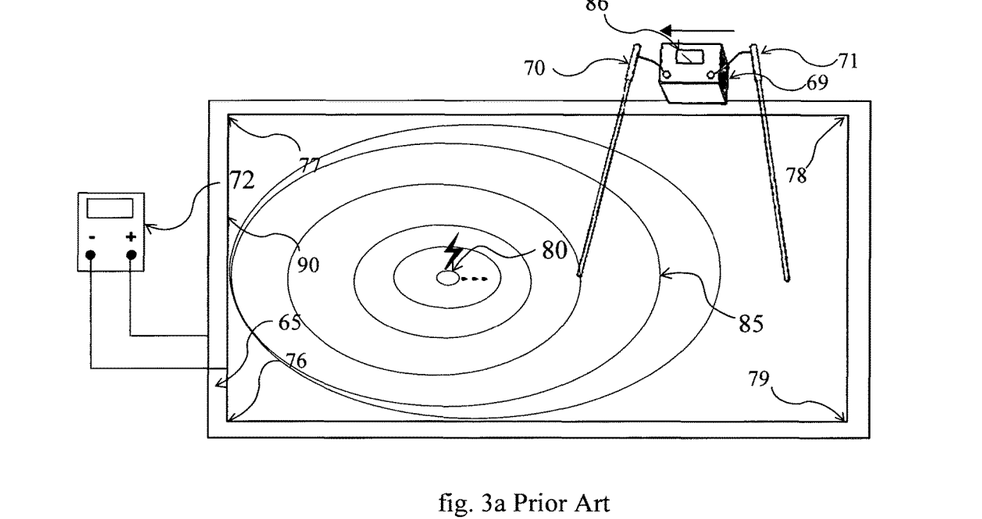
FIGS. 3a and 3b are top down and side cutaway views, respectively, of a system according to Lorenz where the membrane has a breach.
Figure 3B:
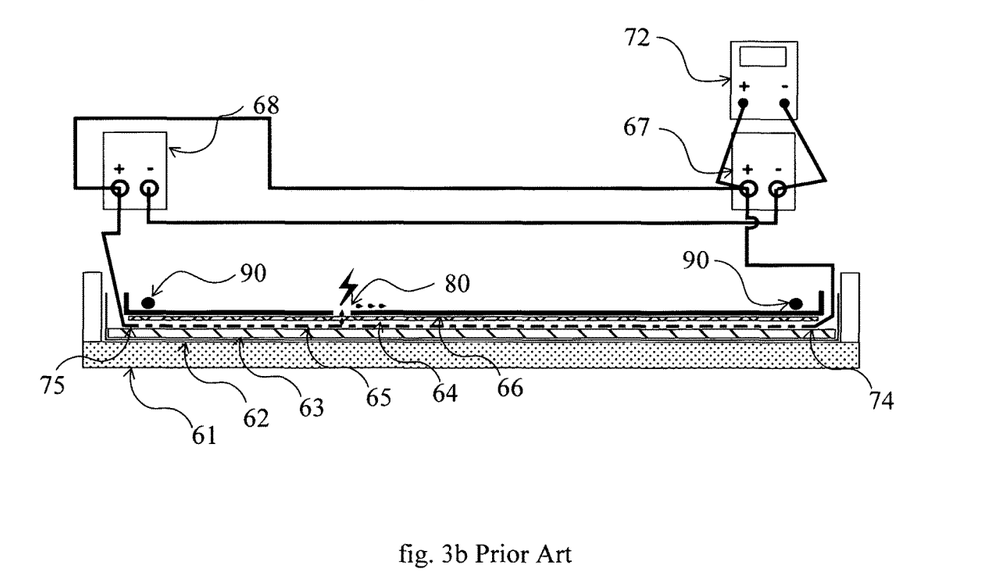

Now referring to FIGS. 3a and 3b, and still exemplifying Lorenz, a scenario with a leak 80 is provided. Leak 80 in the membrane 66 is sufficient to allow water to contact the metal grating 65. Current flows over the wet membrane 66 from the conductive wire loop 90 to the metal grating 65. This causes voltage to be measured differently the further the measuring device 69 and poles 70, 71 are from the leak 80 and allows the meter 86 to indicate the direction of the slope of the voltage. This allows the technician placing the poles in different locations to read the meter, i.e. the direction of lean of the needle, which indicates the direction to the leak.

Figure 4A:
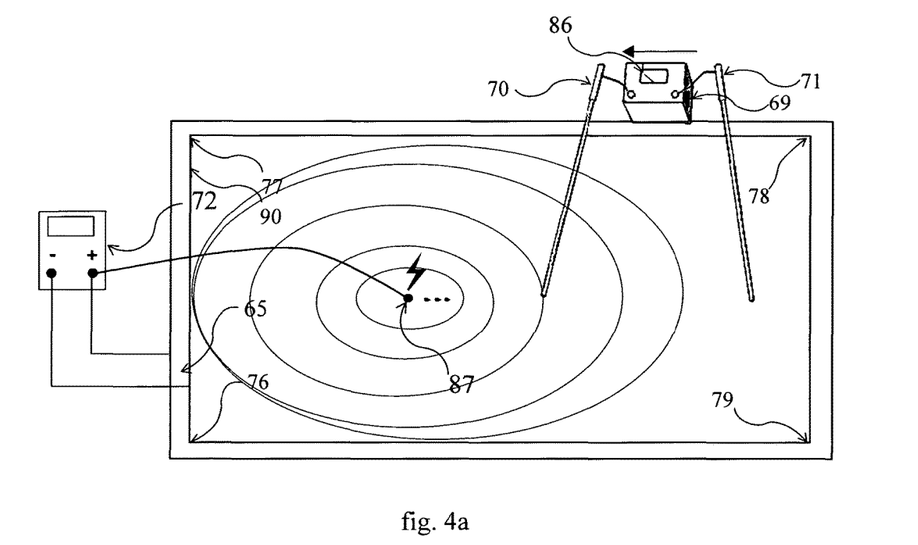
FIGS. 4a and 4b are top down and side cutaway views, respectively, of a system according to Lorenz with a breach mimic.
Figure 4B:
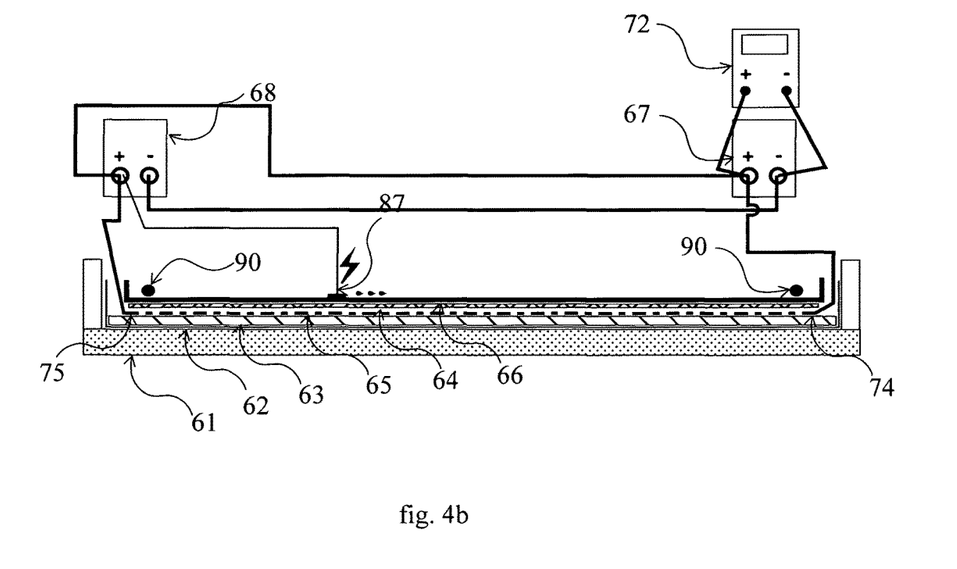

Now referring to FIGS. 4a and 4b, a system consistent with Lorenz is provided, but with the addition of test of the effectiveness of the system. This effectiveness test is not disclosed in Lorenz. The effectiveness test uses an electrical leak mimic 87. This mimic is nothing more than a wire connected to the same terminal on the power source 72 to which the metal grating is connected. This wire is then placed on the top surface of the membrane 66 so that the current will flow from the negative to the positive terminal on the power source 72 allowing the technician to use the measuring device 69 and the poles 70, 71 to see if the device can indeed locate the null reference which is the leak mimic 87.

Figure 5A:
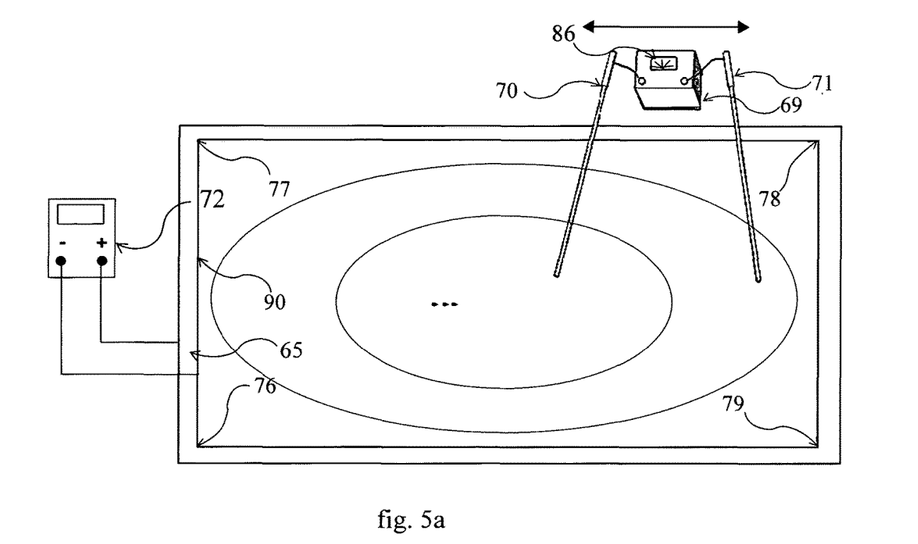
FIGS. 5a and 5b are top down and side cutaway views, respectively, of a system according to Lorenz where the membrane has become conductive.
Figure 5B:
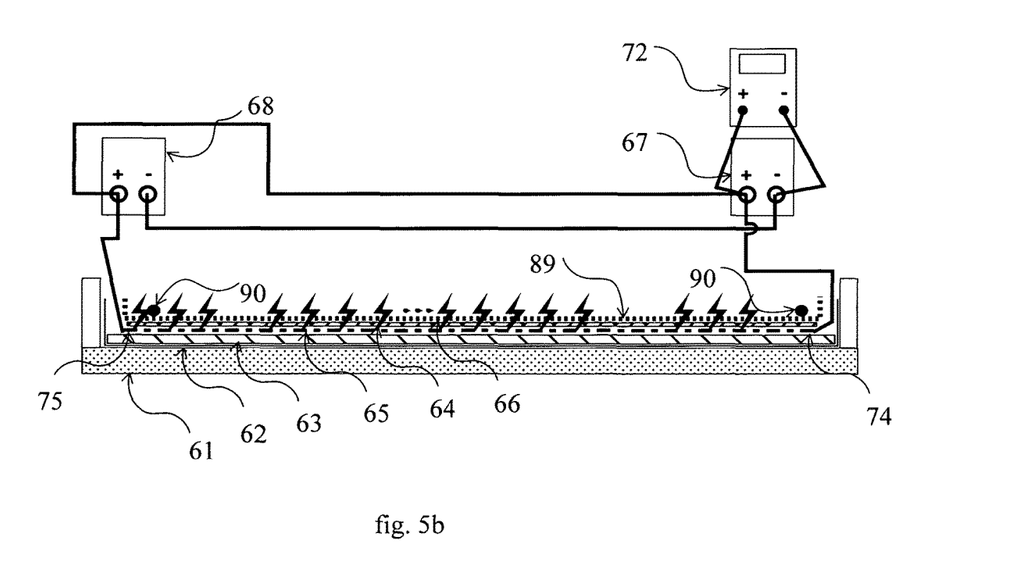

Now referring to FIGS. 5a and 5b, again a system consistent with Lorenz is provided, but the scenario where membrane 66 becomes conductive is described. Such a scenario is not disclosed in Lorenz. The degree of developing electrical permeability depends on the membrane material and manufacture and the weather conditions. The electrically permeable membrane 89 indicates many small changes in voltage when referenced to the metal grating and thus either confuses the measurement device 69 by pulling the indicator 86 to one side or the other as the poles are moved even a small amount. The membrane 89 acts as a sink for the electrical field and continually drains, in a manner of speaking, the energy contained in the field over the entire wetted surface of the membrane.

Figure 6A:
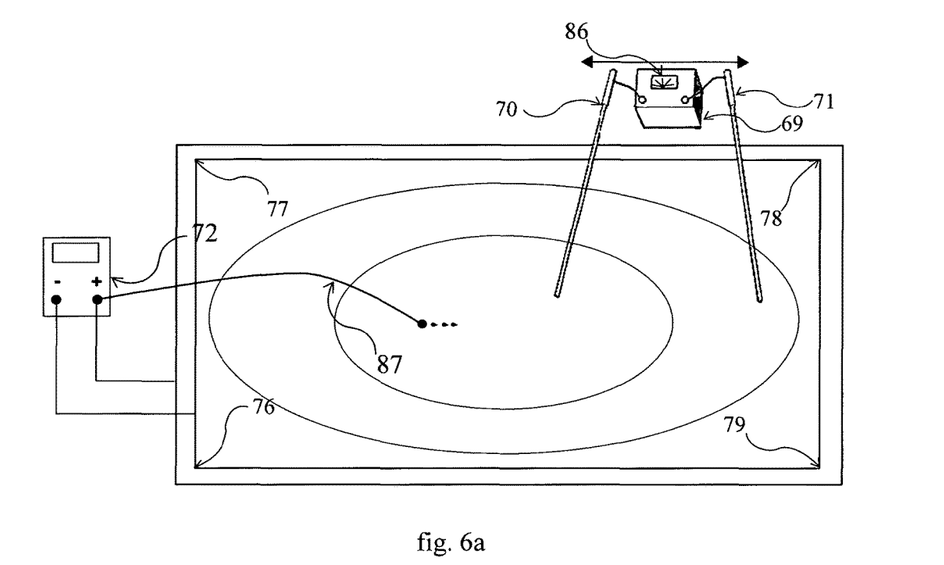
FIGS. 6a and 6b are top down and side cutaway views, respectively, of a system according to Lorenz where the membrane has become conductive with a breach mimic.
Figure 6B:
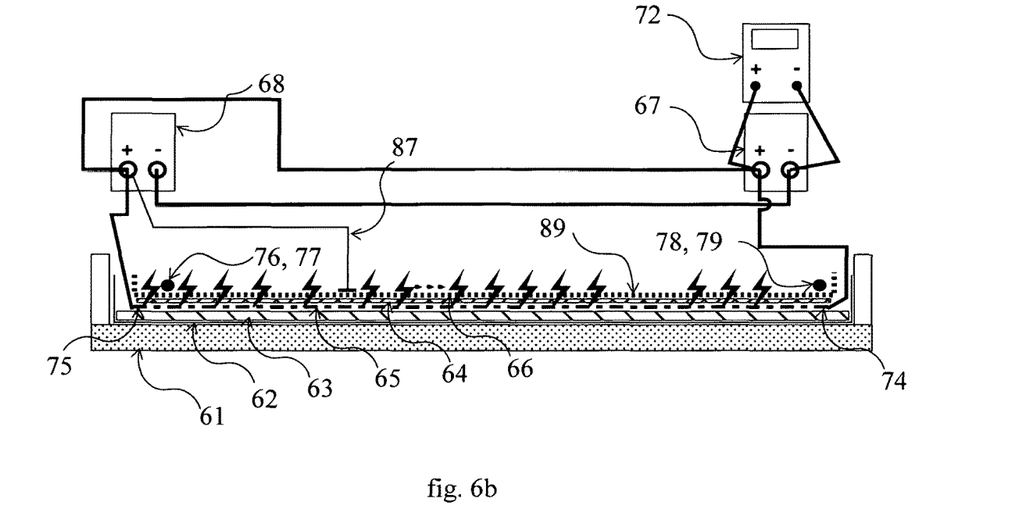

Now referring to FIGS. 6a and 6b, again a system consistent with Lorenz is provided, but the scenario where membrane 66 has become electrically permeable membrane 89 and electrical leak mimic 87 is placed on the surface is described. The result is the same as if the mimic 87 were not even placed, or if the other pole of the power source 72 were not referenced by the mimic 87. The mimic cannot be seen and the slope of the electrical field cannot be determined by the measurement device, as the field has been drawn through the membrane to the metal grating over its entire surface.

Figure 7A:
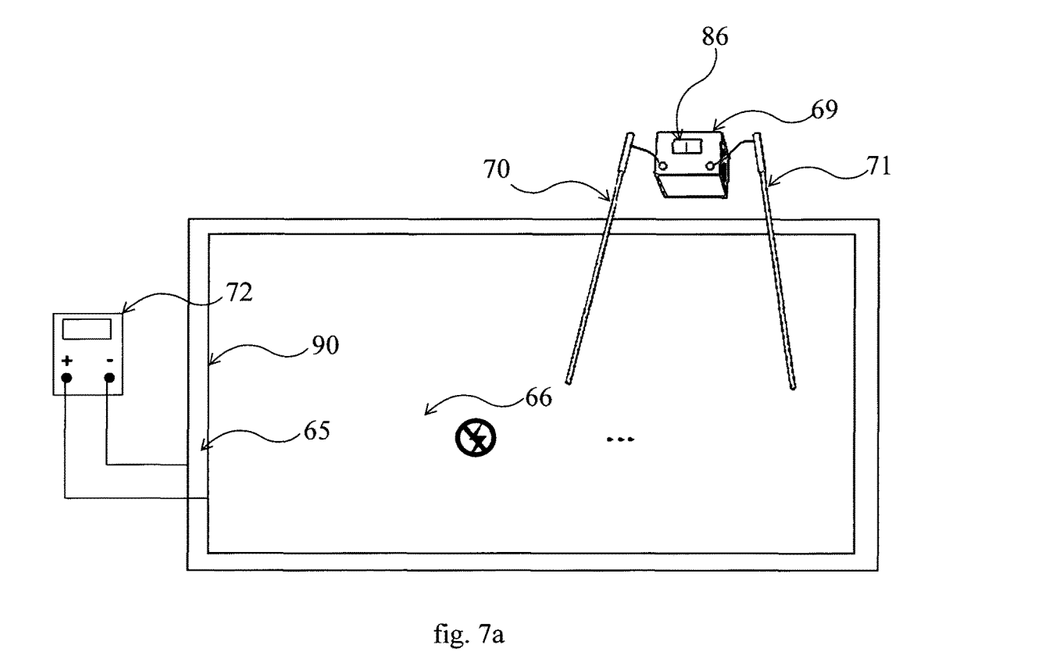
FIGS. 7a and 7b are top down and side cutaway views, respectively, of the system of the present invention.
Figure 7B:
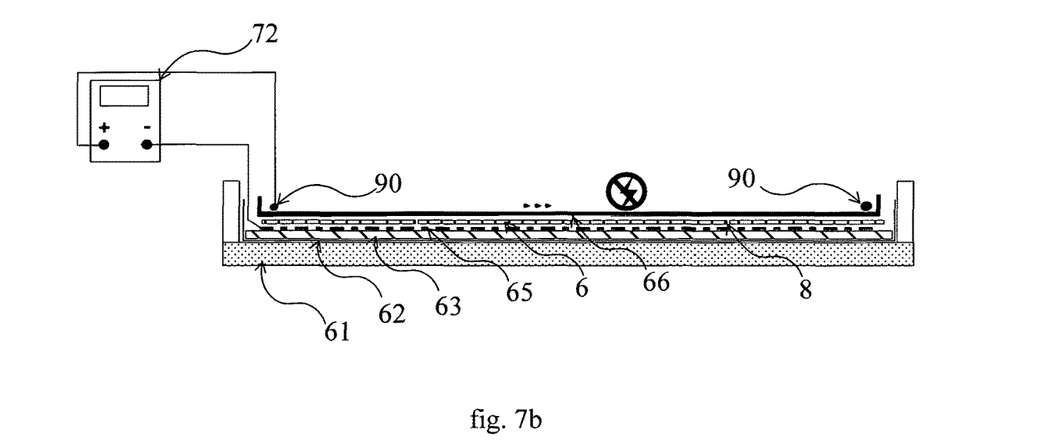
Figure 7C:
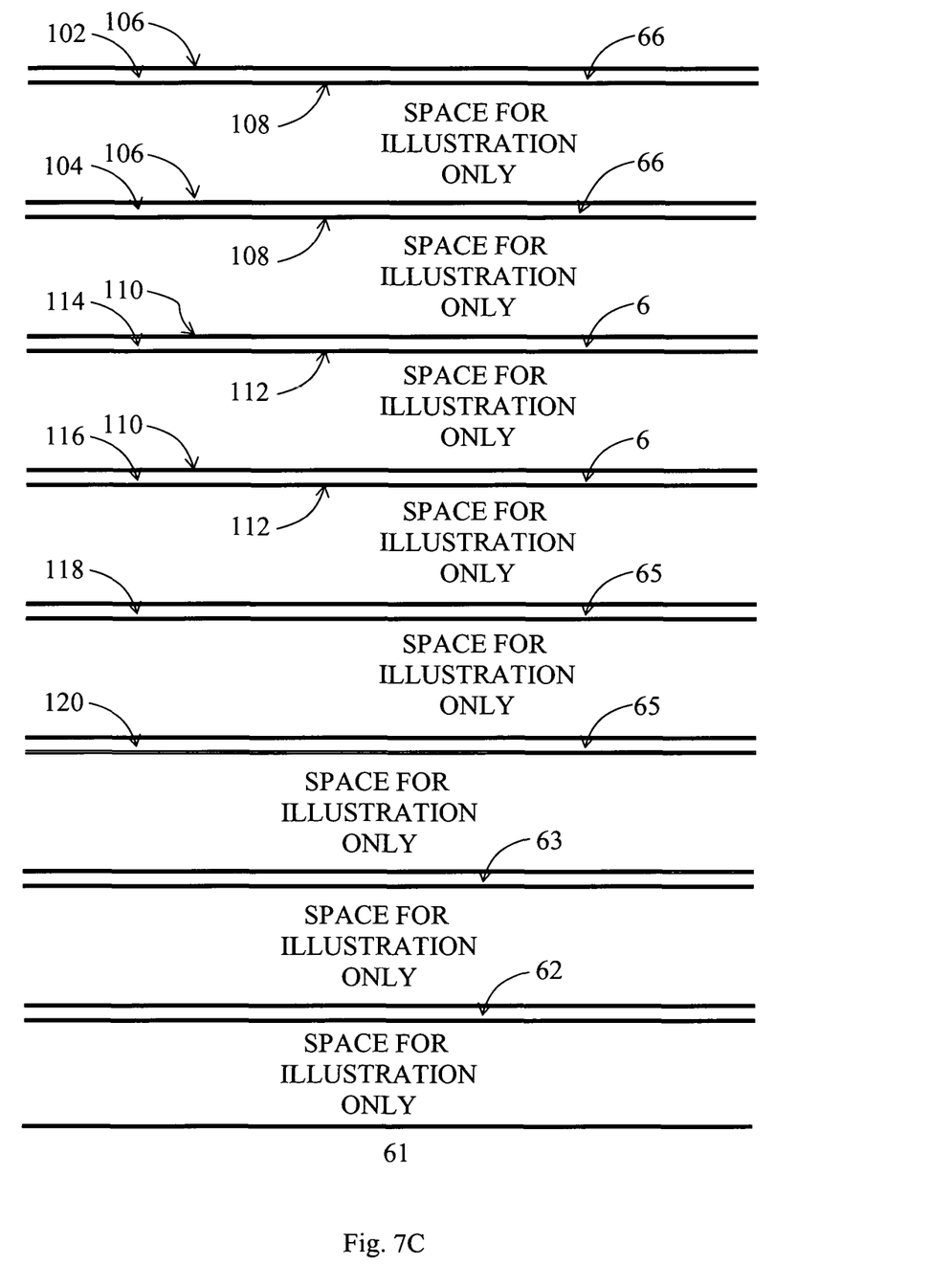
FIG. 7c is an exaggerated cutaway view of the layers of the layers of the system of the present invention with two waterproofing membranes, two layers of underlayment, and two layers of conductive grating.

Now referring to FIGS. 7a-7c, the system of the present invention is provided. The system of the present invention is similar to that disclosed in Lorenz, but also includes an underlayment 6 disposed between membrane 66 and metal grating web 65. Like Lorenz, the present system includes waterproofing membrane 66. As discussed above, although more than one waterproofing membrane may be included in the present system, the system shown in FIGS. 7a and 7b includes only one waterproofing membrane 66 for simplicity of illustration. As such, waterproofing membrane 66 represents both the uppermost waterproofing membrane 102, i.e. the waterproofing membrane furthest from structure 61, and the lowermost waterproofing membrane 104, i.e. the waterproofing membrane closest to structure 61. It is understood, however, that even in systems that include more than one waterproofing membrane, i.e. separate uppermost and lowermost waterproofing membranes 102, 104, the underlayment 6 is always directly beneath the lowermost waterproofing membrane 104, just as FIG. 7b shows underlayment 6 directly below waterproofing membrane 66/lowermost waterproofing membrane 104 in this system. Waterproofing membrane has upper side 106 and lower side 108. Underlayment 6 has upper side 110 and lower side 112. Also as discussed above, although more than one underlayment may be included in the present system, the system shown in FIGS. 7a and 7b includes only one underlayment 6 for simplicity of illustration. As such, underlayment 6 represents both the uppermost underlayment 114, i.e. the underlayment furthest from structure 61, and the lowermost underlayment 116, i.e. the underlayment closest to structure 61. It is understood, however, that even in systems that include more than one underlayment, i.e. separate uppermost and lowermost underlayments 114, 116, the underlayment 6 is always above conductive layer 65, just as FIG. 7b shows underlayment 6 above conductive layer 65 in this system. Also as discussed above, although more than one conductive layer may be included in the present system, the system shown in FIGS. 7a and 7b includes only one conductive layer 65 for simplicity of illustration. As such, conductive layer 65 represents both the uppermost conductive layer 118, i.e. the conductive layer furthest from structure 61, and the lowermost conductive layer 120, i.e. the conductive layer closest to structure 61. FIG. 7c focuses on the various layers of the system only and illustrates a system of the present invention that includes separate uppermost and lowermost waterproofing membranes 102 and 104; separate uppermost and lowermost underlayments 114 and 116 and separate uppermost and lowermost conductive layers 118 and 120. For illustrative purposes only, spaces are shown between the various layers of the system shown in FIG. 7c. There are two waterproofing membranes 66—uppermost waterproofing membrane 102, which is furthest from structure 61, and lowermost waterproofing membrane 104, which is closest to structure 61. Each of uppermost waterproofing membrane 102 and lowermost waterproofing membrane 104 has an upper side 106 and a lower side 108. There are two underlayments 6—uppermost underlayment 114, which is furthest from structure 61, and lowermost underlayment 116, which is closest to structure 61. Each of uppermost underlayment 114 and lowermost underlayment 116 has an upper side 110 and a lower side 112. As required, underlayments 6 are disposed directly below lowermost waterproofing membrane 104. There are two conductive layers 65—uppermost conductive layer 118, which is furthest from structure 61, and lowermost conductive layer 120, which is closest to structure 61. As required, conductive layers 65 are disposed below lowermost underlayment 116. Underlayment 6 is non-conductive and cannot become conductive unless either bypassed with water from membrane leakage, or saturated by water from membrane leakage. As used herein in this context, the term "saturated" will refer to both the possibility of the underlayment 6 being saturated by water or the possibility of the underlayment 6 being bypassed with water from membrane leakage. The underlayment 6 may be bypassed with water from a leak in the waterproofing membrane if the water gets down to the conductive layer 65 through the joints 8 between the boards of underlayment 6 or around the edges of underlayment 6. The setup for indicating a leak is essentially the same as the Geesen and Lorenz patents. This setup is a power source 72, a conductive loop 90; a non-conductive roofing or waterproofing membrane 66; the measurement device 69; poles 70, 71; and the meter 86 on the measurement device 69. Like Lorenz, the present invention includes metal grating web 65, possibly with separating layer 64 for padding, membrane 66, and conductive loop 90. The present invention also includes underlayment 6 disposed between membrane 66 and metal grating web 65. The key aspect of underlayment 6 is that is it non-conductive and will not become conductive unless and until saturated by water from membrane leakage or bypassed by water from membrane leakage to the metal grating web on the underside via the joints between adjacent substrate boards. Underlayment 6 may, therefore, be made of any material that meets these criteria. Examples include, wood, gypsum, polyisocyanurate, fiberglass, or other non-conductive materials. The present invention may also include joints 8 in the underlayment 6 where the boards are butted together, as this provides the most common conduit for water from membrane leakage to reach the metal grating web. When there is not leakage, the measurement device meter 69 indicates no change in voltage from one point to the next.

Figure 8A:
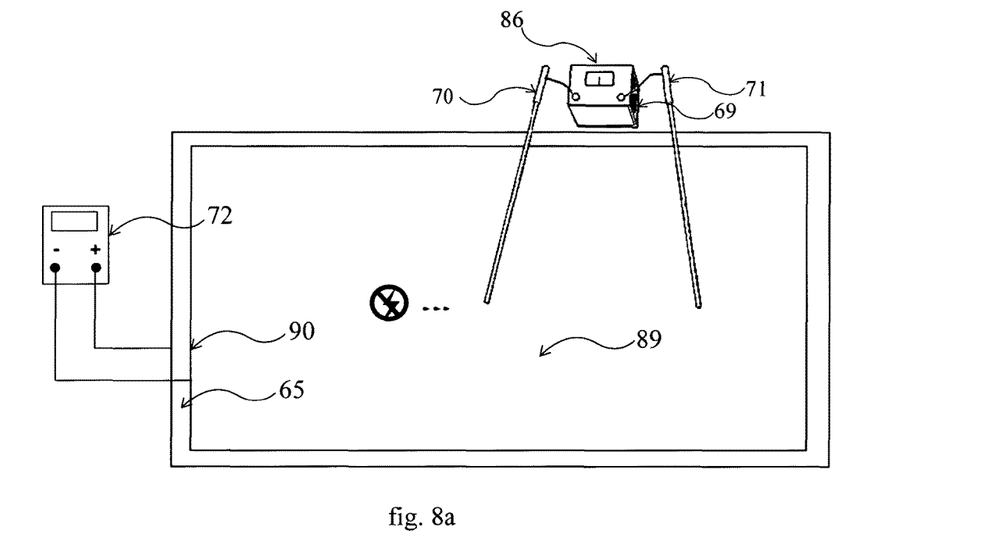
FIGS. 8a and 8b are top down and side cutaway views, respectively, of the system of the present invention where the membrane has become conductive.
Figure 8B:
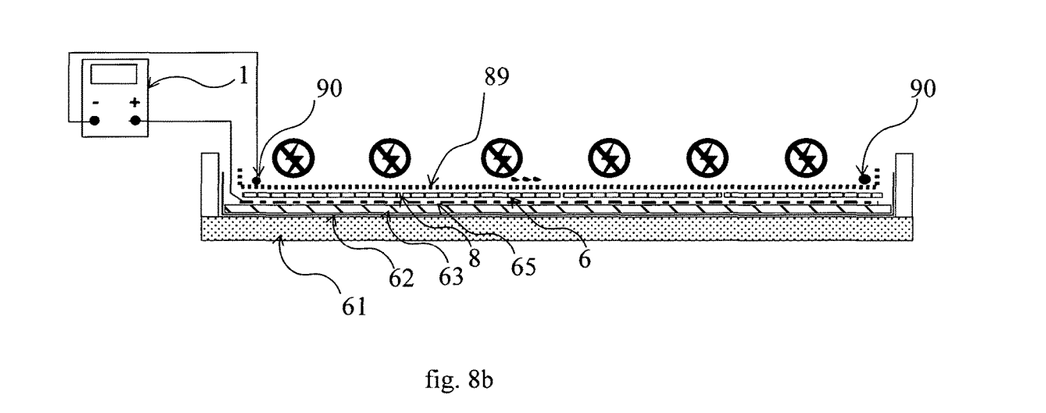

Now referring to FIGS. 8a and 8b, the system of the present invention is shown where membrane 66 has become conductive membrane 89. When membrane 66 becomes conductive membrane 89, the electrical field generated by power source 72 is allowed to pass through conductive membrane 89. Measurement device 72 does not see any change in voltage because the electrically non-conductive underlayment 6 does not allow casual transference of electrical current to the metal grating web 65, so no current flows. The indicator 86 on the measurement device 69 shows no slope in either direction.

Figure 9A:
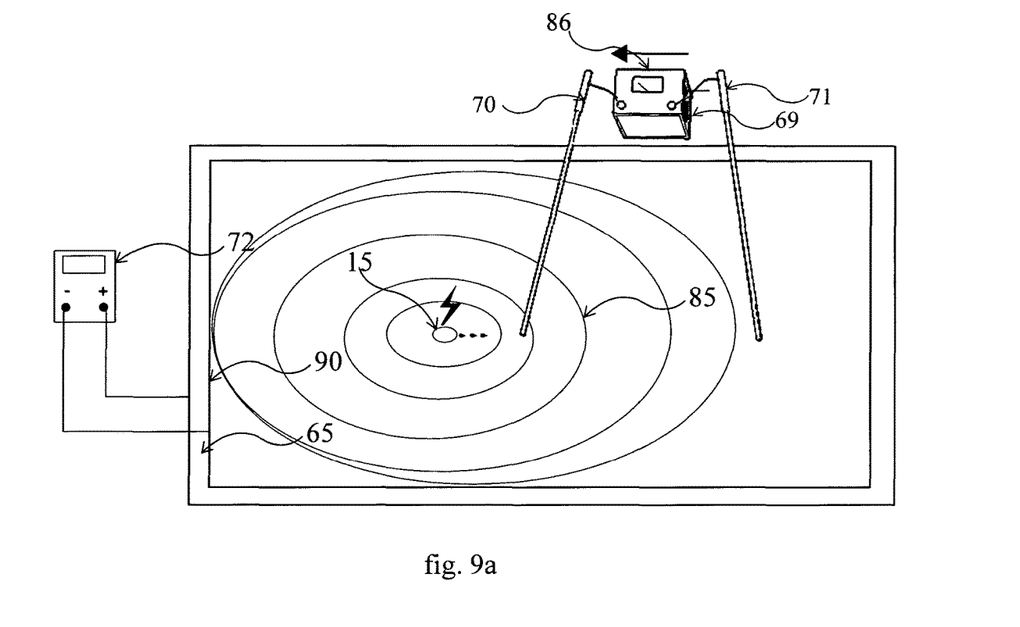
FIGS. 9a and 9b are top down and side cutaway views, respectively, of the system of the present invention where the membrane has a leak.
Figure 9B:
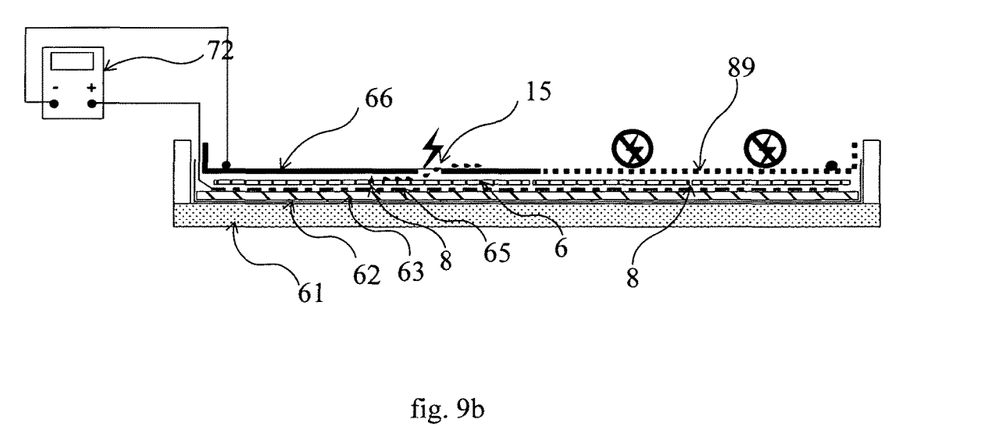

Now referring to FIGS. 9a and 9b, the system of the present invention is shown when membrane 66 develops a leak 15. Leak 15 allows water to flow to the metal grating web 65 via a joint 8 in the underlayment 6. With the present invention and the presence of underlayment 6, it does not matter if the membrane 66 is non-conductive or conductive, as the underlayment 6 does not allow casual flow of electrical current from the surface of the membrane 66 and through the membrane 66 to the metal grating web 65. The only way to trigger a leak 15 that can be discovered is for the water to reach and actually contact the metal grating web 65 through the joints 8 in the underlayment 6 or by saturating the underlayment 6. The indicator 86 on the measurement device 69 will always indicate the direction of the null reference at the point of leakage 15 in the membrane 66, whether the membrane 66 is conductive or non-conductive.

Figure 10A:
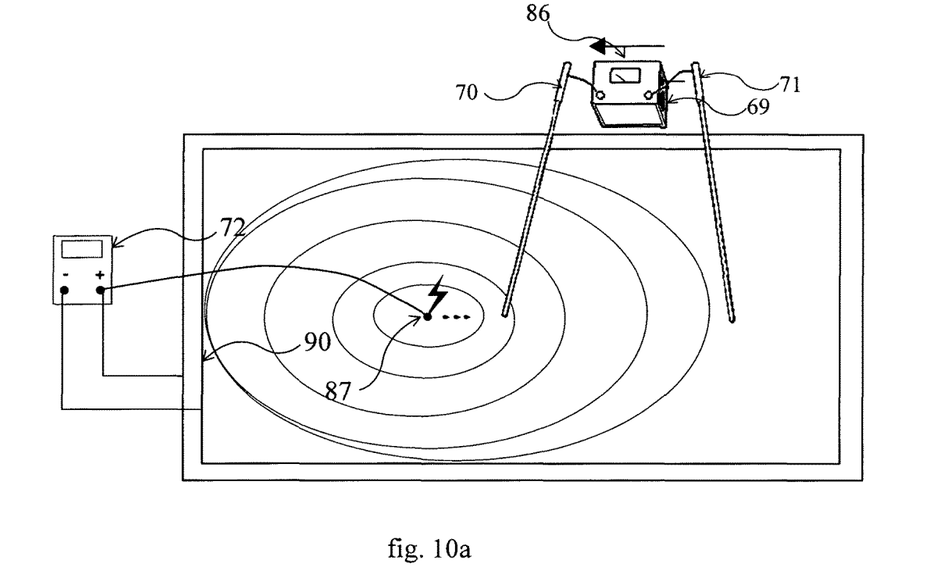
FIGS. 10a and 10b are top down and side cutaway views, respectively, of the system of the present invention with a breach mimic.
Figure 10B:
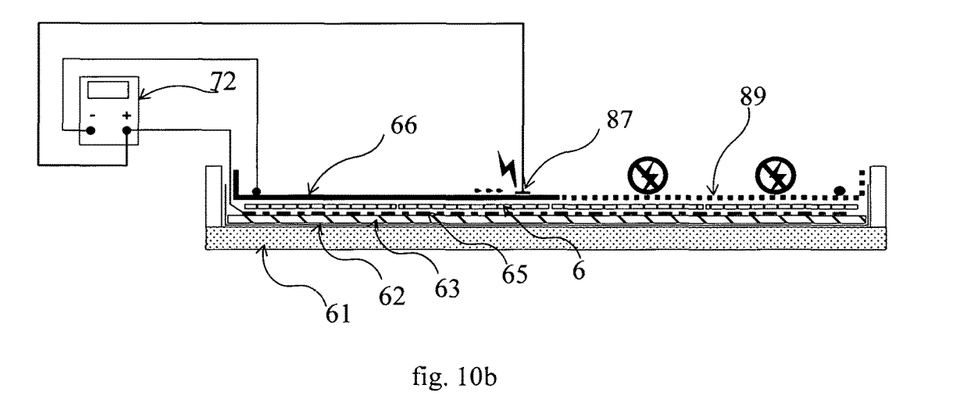

Now referring to FIGS. 10a and 10b, the system of the present invention is provided with an electrical leak mimic. FIG. 10 shows what the measurement device 86 indicates when an electrical leak mimic 87 is placed on a membrane 66 that is either electrically impermeable or permeable. The indicator 86 on the measurement device 69 always indicates the direction of the mimic 87 as the underlayment 6 does not allow casual flow of electrical current from the surface of the membrane to the conductive layer.

Although the present invention has been described in considerable detail with reference to certain preferred versions thereof, other versions would be readily apparent to those of ordinary skill in the art. Therefore, the spirit and scope of the description should not be limited to the description of the preferred versions contained herein.

I claim:
1. A leak detection and location system for detecting and locating leaks in waterproofing membranes, comprising:
   at least one waterproofing membrane with an upper side and a lower side;
   at least one underlayment with an upper side and a lower side disposed directly below a lowermost waterproofing membrane of said at least one waterproofing membranes, wherein said at least one underlayment is non-conductive and will become conductive only when saturated;
   at least one conductive layer disposed below a lowermost underlayment of said at least one underlayments;
   a voltage source with first and second poles, wherein said first pole of said voltage source is attached to said upper side of an uppermost waterproofing membrane of said at least one waterproofing membranes and said second pole is attached to said conductive layer;
   a test set comprising:
      two handheld poles, each of which detect a voltage at a location where said pole is located; and
      an indicator that indicates a difference between said voltages detected by each of said handheld poles; and
   a device that creates an electrical field across said at least one waterproofing membrane.

2. The leak detection and location system as claimed in claim 1, wherein said at least one underlayment is made of polyisocyanurate.

3. The leak detection and location system as claimed in claim 1, wherein said at least one underlayment is made of wood.

4. The leak detection and location system as claimed in claim 1, wherein said at least one underlayment is made of fiberglass.

5. The leak detection and location system as claimed in claim 1, wherein said at least one underlayment is made of bitumen.

6. The leak detection and location system as claimed in claim 1, wherein said at least one underlayment is made of gypsum.

7. The leak detection and location system as claimed in claim 1, further comprising adhesion between at least one of:
   said lowermost waterproofing membrane of said at least one waterproofing membrane and an uppermost underlayment of said at least one underlayments; and
   said lowermost underlayment of said at least one underlayments and an uppermost conductive layer of said at least one conductive layers.

8. The leak detection and location system as claimed in claim 7, wherein said adhesion is with glue.

9. The leak detection and location system as claimed in claim 7, wherein said adhesion is with foam adhesive.

10. The leak detection and location system as claimed in claim 9 wherein said foam adhesive is only applied between a portion of said underlayment and said conductive layer.

11. The leak detection and location system as claimed in claim 7, wherein said adhesion is with bitumen.

12. The leak detection and location system as claimed in claim 1, wherein said at least one conductive layer is a metal mesh.

13. The leak detection and location system as claimed in claim 12, wherein said at least one conductive layer is a multi-axial expansion-constrained conductive medium.

14. The leak detection and location system as claimed in claim 12, wherein said at least conductive layer is a matrix of welded wire.

15. The leak detection and location system as claimed in claim 1, wherein said at least one conductive layer is one of a group consisting of conductive polymer, conductive filament, and conductive coating.

16. The leak detection and location system as claimed in claim 1, wherein said device that creates the electrical field is a boundary wire loop.

17. The leak detection and location system as claimed in claim 1, wherein said device that creates the electrical field is at least one attractor cable.

18. The leak detection and location system as claimed in claim 1, wherein said test set further comprises an ammeter.

19. The leak detection and location system as claimed in claim 1, further comprising at least one layer of non-conductive vapor barrier disposed below a lowermost conductive layer of said at least one conductive layers.

20. A leak detection and location system for detecting and locating leaks in waterproofing membranes, comprising:
   a waterproofing membrane with an upper side and a lower side;
   an underlayment with an upper side and a lower side disposed directly below said waterproofing membrane, wherein said underlayment is non-conductive and will become conductive only when saturated;
   a conductive layer disposed below said underlayment;
   at least one non-conductive vapor barrier disposed below said conductive layer;
   a voltage source with first and second poles, wherein said first pole of said voltage source is attached to said upper side of said waterproofing membrane and said second pole is attached to said conductive layer;
   a test set comprising:
      two handheld poles, each of which detect a voltage at a location where said pole is located; and
      an indicator that indicates a difference between said voltages detected by each of said handheld poles; and
   a device that creates an electrical field across said waterproofing membrane.

* * * * *